United States Patent [19]

Leinkram

[11] 3,839,108

[45] Oct. 1, 1974

[54] METHOD OF FORMING A PRECISION PATTERN OF APERTURES IN A PLATE

[75] Inventor: Charles Z. Leinkram, Bowie, Md.

[73] Assignee: The United States of America as represented by the Secretary of the Navy, Washington, D.C.

[22] Filed: July 22, 1970

[21] Appl. No.: 57,258

[52] U.S. Cl. .......... 156/3, 156/11, 156/13, 350/162 ZP, 350/178, 350/320

[51] Int. Cl. .......... B31b 31/22, G02b 5/18

[58] Field of Search .......... 350/162 ZP, 320, 162 R, 350/178; 156/3, 8, 7, 15, 18, 22; 117/217, 211; 29/580, 577

[56] References Cited

UNITED STATES PATENTS

| | | | |
|---|---|---|---|
| 2,536,383 | 1/1951 | Mears et al. | 156/11 |
| 2,731,333 | 1/1956 | Ko et al. | 117/5.5 |
| 3,110,620 | 11/1963 | Bertelsen | 117/217 |
| 3,139,392 | 6/1964 | Mears | 156/3 |
| 3,181,986 | 5/1965 | Pritikin | 156/247 |
| 3,290,191 | 12/1966 | Davis | 156/3 |
| 3,545,854 | 12/1970 | Olsson | 350/162 ZP |
| 3,620,933 | 11/1971 | Grumwald et al. | 156/3 |
| 3,642,548 | 2/1972 | Eger | 156/13 |

OTHER PUBLICATIONS

IBM Tech. Disclosure Bul. (Vol. 8, No. 12, May 1966), "Phase Plate Lens for Multiple Image System", Electronics (Mar. 20, 1967), pp. 93–96.

*Primary Examiner*—George F. Lesmes
*Assistant Examiner*—R. J. Roche
*Attorney, Agent, or Firm*—R. S. Sciascia; Arthur L. Branning; M. L. Crane

[57] ABSTRACT

A method of forming a precision geometrical pattern of apertures in a plate comprising the steps of coating an optically polished plate of metal such as copper with a layer of nickel or chromium and coating the primary layer of nickel or chromium with a thin layer of gold; forming the aperture pattern in the gold layer using conventional photo-etching techniques; and removing the nickel or chromium and the copper from the aperture area by etching. The article thus formed is a heavy copper ring having a central opening across which extends an ultra-thin film of gold precisely apertured in the desired geometrical pattern.

An alternate approach described herein is to deposit a thin layer of aluminum on a polished glass surface followed by a deposition of gold. The aperture pattern is again etched in the gold using the same photoetching techniques, and after the photo resist has been removed a plastic ring is cemented to the gold layer surrounding the aperture pattern. The glass assembly is then immersed in a dilute potassium hydroxide solution, the aluminum is dissolved, the gold-plastic assembly is then floated free to yield a plastic ring supporting a gold film extending thereacross through which is formed the desired aperture pattern.

4 Claims, 3 Drawing Figures

PATENTED OCT 1 1974 3,839,108

INVENTOR

CHARLES Z. LEINKRAM

BY [signatures] ATTORNEYS

METHOD OF FORMING A PRECISION PATTERN OF APERTURES IN A PLATE

BACKGROUND OF THE INVENTION

This invention relates broadly to a method of forming a precision pattern of apertures in a metal plate, and more specifically to a method of forming a self supporting system supported by a ring structure attached to the inactive periphery of a Fresnel zone plate having a shorter focal length and capable of forming brighter, sharper images than those formed by prior art methods.

Examination of the sun's extreme ultraviolet spectrum by means of high altitude rockets and satellites has been performed for many years by various government agencies and universities. Experiments with conventional normal incidence diffraction grating optics which produce high spatial resolution monochromatic solar disc images have been performed successfully down to wavelengths as short as 170 A. Below this wavelength normal incidence reflectances are so low that conventional UV optics can not be utilized. Dual reflectance, grazing incidence Wolter lens systems have been used to some extent in this wavelength range, but have the following problems which are not present in a Fresnel zone plate optical system: They are much more expensive, they are quite bulky, and have a very small aperture relative to their cross section perpendicular to their optical axis. Therefore their utilization in optical systems in combination with diffraction gratings is quite difficult due to limitations on the usual areas of gratings. Wolter lens systems to date, because of the limitations described above, have been used primarily to obtain narrow bandpass (in combination with different thin metal filters) images in this wavelength range. Sucess in obtaining monchromatic images has been very limited and probably will remain so until grating ruling techniques are considerably improved. It has been suggested by many authors that extreme ultraviolet light could be focused by means of a Fresnel zone plate, (c.f., James A. R. Samson's *Techniques of Vacuum Ultraviolet Spectroscopy*, published in 1967 by John Wiley & Son, New York, page 78). While theoretically the use of a Fresnel zone plate in combination with a plane grating with light striking the gating at high angle of incidence to increase its reflectivity would be a very efficient optical system, the most carefully constructed Fresnel zone plates previously made do not have sufficient apertures to produce usable images for space application. The beam which the zone plate must focus is very narrow, and the finest zone plates available up until now simply do not allow enough light to pass to form an image of sufficient brightness to be usable.

The ideal Fresnel zone plate has a series of concentric rings spaced apart a distance which allows the path of light from adjacent rings to the center of the image at the focal point to differ by one wavelength of the incident radiation. For a theoretically perfect zone plate, the radius of the $n^{th}$ ring from the center is:

$r = (f n \lambda + n^2 80\ 2/4\ )\ 1/2$ where $f$ is the focal length of the zone plate for a wavelength of $\lambda$. Thus, to build a zone plate having a focal length of 50 centimeters for ultraviolet light of 100, the radius of the first ring must be approximately 0.07 mm, and the radius of the second ring is approximately 0.1 mm. This extreme narrow spacing is necessary to achieve an image of good resolution and brightness from a very narrow beam, and exceeds by far the finest prior art zone plate yet constructed which has dimensions approximately 60 times greater than theoretically desirable.

Up until now there has been no technique whatever to achieve the extreme narrow spacing of the circular slits in the zone plate. The various techniques taught in the prior art for making precision apertures in a metal plate are not applicable to the instant requirements. For example, it is necessary that the Fresnel zone plate support itself because the problems of handling and supporting a zone plate that is not self-supported result in absorption of the ultraviolet light by the supportive material. The prior art zone plates that have been constructed are generally too flimsy to withstand the G forces and vibration incident to launching beyond the atmosphere. It is necessary also that the zone plate be extremely thin material to avoid interference with the light passing through the open zones and acting, in effect, as a collimator. A further requirement is that the zone plate provide massive thermal paths to prevent build-up of high temperature and consequent warping of the zone plate during use.

There has thus been an increasing need for a method of forming a Fresnel zone plate which provides extremely fine and precise formation of very narrow zones in a rugged and self-supportive system which is insensitive to vibration and provides massive thermal paths from the zone plate.

SUMMARY OF THE INVENTION

Accordingly, it is an object of this invention to provide a method for fabricating Fresnel zone plates having zones of under 10 microns.

Another object of the present invention is to provide a method of fabricating a metal plate apertured in a precise pattern of fine lines 10 microns or less across.

Yet another object of the instant invention is to provide an apertured plate 10,000–20,000 Angstroms in thickness which is self-supportive and has etched therethrough a precisely defined pattern of apertures 10 microns or less across.

A still further object of this invention is to provide a method for producing a Fresnel zone plate having a short focal length and high resolution and light gathering power.

These and other objects of the present invention are achieved by providing a method including the steps of plating an optically polished copper plate with a nickel layer and depositing a layer of gold ten thousand Angstroms thick on the nickel. Slits or apertures are formed through the gold layer, using conventional photoetching techniques, and then the copper and nickel from behind the slit area are removed by etching. The resulting article is a heavy ring of copper attached to the inactive periphery of the Fresnel zone system having a large central aperture across which extends a fine film of gold 10,000 Angstroms in thickness and through which is formed a precisely defined aperture pattern.

An alternate approach that achieves the objects of the present invention is to coat a glass slide or a piece of highly polished quartz with a thin layer of aluminum followed by a thin layer of gold. Slits or apertures are formed through the gold layer using conventional photo etching techniques. A plastic ring is glued to the outer periphery of the aperture pattern and, after the glue has set, the entire assembly is immersed in a dilute alkaline solution such as 10% KOH. After the aluminum has been etched completely, the plastic-gold assembly is lifted from the glass, rinsed and dried to yield a plastic ring across which is stretched a gold film having formed therethrough the desired aperture pattern.

DESCRIPTION OF THE DRAWINGS

A more complete appreciation of the invention and its many attendant advantages will develop as the same becomes better understood by reference to the following detailed description when considered in connection with the accompanying drawings, wherein.

DESCRIPTION OF THE PREFERRED EMBODIMENT

Figure 2:
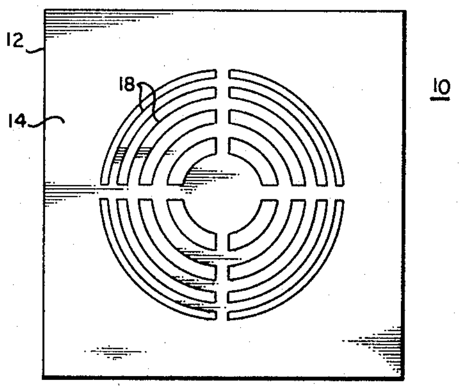
FIG. 2 is a plan view of a Fresnel zone plate, greatly enlarged and simplified, constructed in accordance with the method of the present invention.
Figure 1:
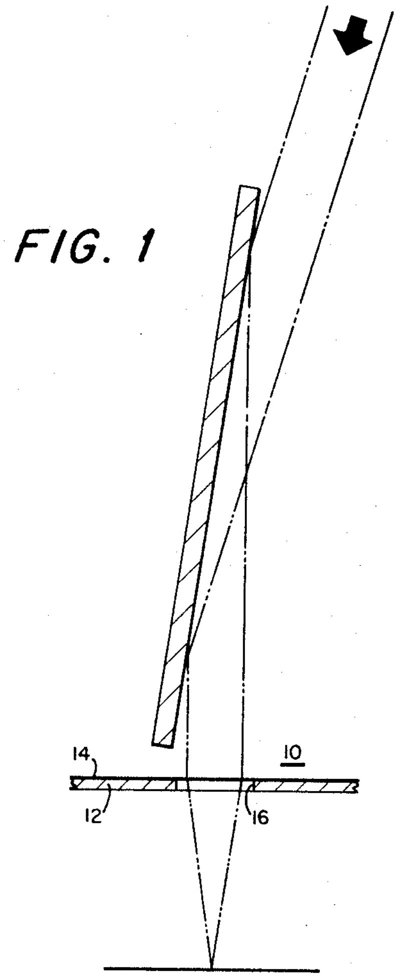
FIG. 1 is a schematic showing of a sectional elevation of a Fresnel zone plate 1 constructed in accordance with the present invention, and showing a typical assembly in which the zone plate finds particular utility.
Figure 3:
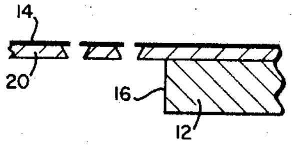
FIG. 3 is a sectional elevation of a portion of a Fresnel zone plate constructed in accordance with the method of the present invention.

The process starts with a copper plate 12 polished to an optically reflective finish. The thickness of the copper plate is not critical but should be sufficiently thick to provide a rugged frame work for an extremely thin film of gold 14 which will eventually be supported across an aperture 16 of approximately 2 centimeters diameter in the plate. A series of concentric circular slits 18 will be formed in the gold film to form the Fresnel zone plate 10. A nickel flash 20 of between 0.1 and 0.2 mils is deposited by electroplating on the optically reflective finish of the copper plate. The thin layer of gold 14, approximately 10,000 Angstroms thick, is then deposited on the nickel plated copper by conventional vacuum depositing techniques. A good gold deposition can be accomplished $3 \times 10^{-5}$ Torr on a substrate heated to and held at approximately 220°C during the deposition.

It is then necessary to form the desired aperture pattern through the gold layer and this is achieved by first making a photomaster of the desired pattern at a must increased scale, for example, 2 feet in diameter. The photomaster is made by cutting and peeling the desired pattern in Rubylith, a red coated Mylar which provides a photomaster of excellent precision and extreme contrast, and then optically reducing the Rubylith pattern to the desired diameter of approximately 1–2 centimeters to yield a photographic mask of the correct size.

The gold deposited side of the substrate is coated with a photoresist composition, such as dilute centrifuged Kodak Metal Btch Resist (also known as KMER) which may be three parts KMER and 1 part KMER thinner, and is then brought into intimate contact with the mask made by the photo reduction of the Rubylith pattern and exposed to a source of intense ultraviolet light, such as a Sylvania "Sun Gun." The substrate is developed and baked to give a resist pattern such that the resist is removed where the final aperture pattern is to be etched, and is then treated with an iodine etch to remove the gold from the aperture pattern uncovered by the previous exposing and developing of the resist. The substrate is removed from the iodine etch when the gold layer has been etched through to the nickel layer. At this point the aperture pattern through the gold is completed.

The exposed nickel layer under the gold layer is then electrolytically etched in a dilute sulfuric acid-glycerine mixture until the exposed nickel underlying the vicinity of the apertures in the aperture pattern is removed completely down to the copper substrate. The nickel is undercut around the apertures through the gold so that the apertures through the nickel are larger than the apertures through the gold.

The gold film-nickel coated substrate is lifted from the nickel etching bath, rinsed off and dried. The reverse or copper side of the substrate is then coated with Kodak Photoresist (known as KPR). The KPR is used because the KMER metal etch resist is not compatible with copper. A circular area directly behind the aperture pattern in the gold layer is covered by a circular mask and the rear face of the copper plate is exposed to ultraviolet light and the plate is then developed and baked at 70°C leaving the masked circular area behind the aperture pattern exposed, that is, free of resist. The gold surface is then recoated with KMER to give added protection to the work area and the entire substrate is submerged in a 10% solution of ammonium persulfate with a slight amount of sulfuric acid added. This causes etching of the exposed area of copper, the circular area immediately behind the aperture pattern in the gold, to be etched away. Etching of the copper is continued until the nickel layer is reached, that is a large circular aperture is etched right through the copper plate behind the aperture pattern in the gold. Thus a copper ring is formed to which the nickel-gold coating is attached and supported across the aperture formed within the copper plate.

The process is substantially finished at this point. It is merely necessary to remove the substrate from the etching solution, the structure then being cleaned and given a quick dip in electrolytic liquid to debur the nickel. Final removal of the KPR is done with trichloroethylene and removal of the KMER is accomplished by soaking in A-20 resist stripping solution.

What remains then is a heavy copper ring having a central circular aperture of 1–2 cm. in diameter formed therethrough, with the thin layer of gold at 10,000A–20,000A attached at its periphery onto the copper ring which layer of gold stretches like a diaphragm across the circular aperture. A fine aperture pattern, such as a series of 125 concentric circles joined by fine ribs to provide a Fresnel zone plate is formed in the gold membrane and the gold is supported by a nickel backing in all areas except the aperture areas. Behind the apertures the nickel is etched away undercutting the gold and leaving no intruding edges to interfere with the light pattern which passes through the aperture pattern. Since the apertures through the gold layer have smaller dimensions than the apertures through the nickel layer, it is the former apertures which provide the optical edges that define the light pattern that is passed by the zone plate. It is the fact that the gold layer is so very thin that it is possible to etch the pattern to the remarkable precision and delicacy achieved. This precision exceeds by far that attained by prior art methods and for the first time it is possible to construct a theoretically ideal Fresnel zone plate. Moreover, the final article is exceptionally strong in comparison with prior art slit plates and Fresnel zone plates because of the heavy copper ring which acts as a support or a frame for the gold membrane. The ring may be mounted in any suitable mount and when it is necessary to adjust or remove the article, it may be handled without special tools. Since it is not necessary at any time to touch the gold film through which the aperture pattern is formed, there will never be any damage caused by clumsy fingers.

The heavy copper frame and the nickel backing provide massive thermal paths for quick attainment of thermal equilibrium during use. In severe thermal environments, any tendency of the gold film to buckle because of localized expansion due to heating thus removed because the heat is readily drained off through the highly conductive gold membrane and the copper frame.

Another advantage of the copper, nickel, gold system described as the first solution to the problem is the close match of thermal coefficients of expansion: gold — $14.3 \times 10^{-6}$, nickel — $14.0 \times 10^{-6}$ and copper — $16.8 \times 10^{-6}$. The necessity of closeness of thermal match is readily apparent when the completed aperture pattern is to be flown in satellites.

The method described above has yielded the desired product but three alternative methods have been developed that also yield a satisfactory product. The first alternative method, chromium is deposited in place of the nickel by means of a vacuum deposition to a thickness of 50–100A. This is again done on a heated copper substrate at a pressure of $5 \times 10^{-5}$ Torr or better. Gold is again deposited as before. Photo etching as before removes the gold from the desired regions of the aperture plate. The exposed chromium is then removed by etching in an alkaline saturated potassium ferricyanide solution and the process follows as with the nickel.

Needless to say other metals such as tantalum, titanium and molybdenum could be used in place of the nickel. Whenever other metals are used, a different etchant must be used.

The second alternate solution to the problem solved by this invention is as follows:

1. Starting with a glass microscope slide or a piece of polished quartz, clean in hot sulfuric acid at 70°C, rinse in deionized water and blow dry with nitrogen.

2. With the glass slides heated to 250°C approximately and a chamber pressure of $5 \times 10^{-5}$ Torr. vacuum deposit a layer of aluminum of 2,000 to 5,000 A. A layer of gold is then deposited immediately on the aluminum to a thickness of approximately 10–15 thousand Angstroms and KMER of proper dilution is applied and the resist exposed, developed and baked as before. Etching in the iodine etch removes the gold from the aperture pattern in the desired areas leaving exposed areas of aluminum where the gold has been removed. Subsequently the photo resist is removed and a lucite ring with an inside diameter slightly larger than the Fresnel pattern is glued with epoxy or other suitable adhesive to the periphery of the pattern. After the glue has dried or cured, the whole assembly is immersed in a dilute alkaline solution such as 10 percent potassium hydroxide to dissolve all of the underlying layer of aluminum. When the aluminum has been etched away completely, the plastic ring with the Fresnel plate stretched across it is floated free from the glass, rinsed in water and is ready for use.

In the third alternative embodiment, it is contemplated that a thin continuous layer of aluminum be left underlying the gold layer to act as a filter. passing the short wave altraviolet and absorbing and reflecting all other wavelengths. The technique for constructing this filtered aperture plate starts with a thin copper plate 0.010: thick that is flat. After vigorous cleaning to remove all possible contaminents, the copper is placed in a vacum chamber and aluminum is deposited upon the heated (250°C) copper at $5 \times 10^{-6}$ Torr. The thickness of the aluminum film runs between 10 and 20 KA. This is then followed by a layer of either chromium or copper topped with a thin layer of gold. The thicknesses used are: chromium 200A, copper 5,000A and gold 5,000A.

It will be apparent that although the invention was described in connection with construction of a Fresnel zone plata, that the invention has application in any situation which requires an extremly precise pattern of apertures of very fine dimension. Its greatest use however is in application in which it is desired to avoid passing the light or radiation through glass or other optically disruptive substances at the wavelength in use.

Obviously numerous modifications and variations of the present invention are possible in the light of the above teachings. It is therefore to be understood that within the scope of appending claims the invention may be practiced otherwise than as specifically described herein.

What is claimed and desired to be secured by Letters Patent of the United States is:

1. A method of forming a Fresnel zone plate comprising:

depositing a layer of aluminum onto a substrate selected from a group consisting of glass and quartz, depositing a layer of gold having a thickness of from about 10,000 Angstroms to about 20,000 Angstroms onto said layer of aluminum, forming a resist pattern onto said gold layer with a desired pattern of resist free areas confined by a peripheral resist area, etching said gold layer in the resist free areas to form a desired aperture pattern therethrough thereby exposing a like pattern of said aluminum, removing the resist pattern from said gold layer, adhering a plastic ring to the peripheral area of said gold layer, etching away the entire aluminum layer, and separating from said substrate said gold layer with aperture pattern therethrough with said plastic ring adhered to the peripheral area thereof.

2. A method of forming a Fresnel zone plate comprising the steps of:

depositing a layer of metal selected from the group consisting of nickel, tantalum, titanium, molybdenum, and chromium onto an optically opaque copper plate, depositing a layer of gold having a thickness of from about 10,000 Angstroms to about 20,000 Angstroms onto said layer of metal, forming a resist pattern onto said gold layer with a desired pattern of resist free areas confined by a peripheral resist area, etching said gold layer in the resist free areas to form an aperture pattern therethrough, thereby exposing a like pattern of said metal layer, etching said exposed metal layer pattern until the exposed metal underlying the vicinity of the etched pattern through said gold layer is removed completely down to the optically opaque plate, and etching an area of said optically opaque plate which area underlies the aperture pattern in said gold layer until said etched metal layer underlying the etched area is reached thereby forming a copper support ring underlying the peripheral area of said aperture pattern in said gold layer.

3. The method defined in claim 2, wherein:

said aperture pattern through said metal layer underlying said aperture pattern in said gold layer is larger in every direction than said aperture pattern through said gold layer therefore said aperture pattern through said gold layer provides the optical edges that define a light pattern that passes through said Fresnel zone plate.

4. A method of forming a Fresnel zone plate comprising the steps of:

depositing a layer of aluminum having a thickness of from about 10,000 to about 20,000 Angstroms onto a copper substrate, depositing a layer of metal selected from the group consisting of copper and chrominum onto said aluminium layer, depositing a layer of gold having a thickness of from about 10,000 Angstroms to about 20,000 Angstroms onto said metal layer, forming a resist pattern onto said gold layer with a desired pattern of resist free areas confined by a peripheral resist area, etching said gold layer in the resist free areas to form an aperture pattern through said gold layer thereby exposing a like pattern of said metal layer, etching said exposed metal layer pattern until the exposed metal layer underlying the vicinity of the etched pattern through said gold layer is removed completely down to said aluminum layer to form a corresponding aperture pattern through said metal layer, and etching an area of said copper substrate which area underlies the aperture pattern in said gold and metal layers until said aluminum layer underlying said etched area of said copper plate is reached thereby forming a copper support ring underlying the peripheral area of said aperture pattern in said gold and metal layers.

* * * * *